(12) United States Patent
Yaginuma et al.

(10) Patent No.: US 9,775,104 B2
(45) Date of Patent: Sep. 26, 2017

(54) MANAGEMENT DEVICE, TERMINAL DEVICE, MANAGEMENT METHOD, CHANNEL SCANNING METHOD, AND MEMORY MEDIUM THAT CARRY OUT CHANNEL SCANNING PROCESSING OF WIRELESS CIRCUIT

(71) Applicant: JVC KENWOOD Corporation, Yokohama-shi, Kanagawa (JP)

(72) Inventors: Tomoko Yaginuma, Yokohama (JP); Ichiro Shishido, Yokohama (JP); Shunichi Manabe, Yokohama (JP); Masae Toko, Yokohama (JP); Yoshihiro Hotta, Yokohama (JP); Kazuya Tsukamoto, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/137,035

(22) Filed: Apr. 25, 2016

(65) Prior Publication Data
US 2016/0353363 A1 Dec. 1, 2016

(30) Foreign Application Priority Data

May 27, 2015 (JP) ................................ 2015-107650

(51) Int. Cl.
*H04W 4/00* (2009.01)
*H04W 48/16* (2009.01)
*H04W 64/00* (2009.01)

(52) U.S. Cl.
CPC ......... *H04W 48/16* (2013.01); *H04W 64/003* (2013.01)

(58) Field of Classification Search
CPC ............................ H04W 48/16; H04W 64/003
See application file for complete search history.

(56) References Cited

U.S. PATENT DOCUMENTS

| | | | | |
|---|---|---|---|---|
| 5,734,977 A * | 3/1998 | Sanmugam | ........... | H04W 12/12 455/410 |
| 6,330,459 B1* | 12/2001 | Crichton | ............... | H04W 16/28 455/434 |
| 2002/0119787 A1* | 8/2002 | Hunzinger | .......... | H04W 76/028 455/455 |
| 2004/0005897 A1* | 1/2004 | Tomoe | ................ | H04W 88/085 455/450 |
| 2006/0215609 A1* | 9/2006 | Kyung | .................. | H04W 48/20 370/331 |
| 2012/0164954 A1* | 6/2012 | Karampatsis | ......... | H04W 4/005 455/67.11 |
| 2012/0230264 A1* | 9/2012 | Zhang | ................... | H04W 72/04 370/329 |

(Continued)

FOREIGN PATENT DOCUMENTS

JP 2013-211803 A 10/2013

*Primary Examiner* — Ajit Patel
(74) *Attorney, Agent, or Firm* — Claire Zopf

(57) ABSTRACT

A reception unit receives positional information of a terminal device from the terminal device via a base station device that uses at least one of a plurality of channels. A generation unit generates channel information related to a channel in scan processing of the terminal device on the basis of the positional information received by the reception unit. A transmission unit transmits the channel information generated by the generation unit to the terminal device via the base station device.

9 Claims, 16 Drawing Sheets

(56) References Cited

U.S. PATENT DOCUMENTS

| | | | | |
|---|---|---|---|---|
| 2013/0225165 A1* | 8/2013 | Das | ................ | H04W 48/16 |
| | | | | 455/434 |
| 2014/0064128 A1* | 3/2014 | Park | ................ | H04W 48/12 |
| | | | | 370/252 |
| 2016/0135210 A1* | 5/2016 | Nammi | ............ | H04W 72/1231 |
| | | | | 370/329 |

* cited by examiner

| COMMAND | PARAMETER 1 | PARAMETER 2 |
|---|---|---|
| POSITIONAL INFORMATION RESPONSE | POSITIONAL INFORMATION | Ch A |

| COMMAND | PARAMETER 1 | PARAMETER 2 |
|---|---|---|
| PRIORITY CHANNEL SPECIFICATION | PRIORITY (1: HIGHEST PRIORITY) | Ch B |

| AREA | BASE STATION DEVICE | PRIORITY CHANNEL |
|---|---|---|
| 1-1 | FIRST BASE STATION DEVICE | Ch A |
| 1-2 | SECOND BASE STATION DEVICE | Ch B |
| 1-3 | THIRD BASE STATION DEVICE | Ch C |

| PRIORITY CHANNEL | Ch B |
|---|---|
| NORMAL CHANNEL | Ch A<br>Ch C<br>Ch D<br>Ch E<br>. . . |

| AREA 1 | AREA 2 | PRIORITY CHANNEL 1 | PRIORITY CHANNEL 2 |
|---|---|---|---|
| 1-1 | NONE | Ch A | — |
| | 2-1 | Ch A | Ch C |
| 1-2 | NONE | Ch B | — |
| | 2-2 | Ch B | Ch C |
| 1-3 | NONE | Ch C | — |
| | 2-1 | Ch C | Ch A |
| | 2-2 | Ch C | Ch B |

| PRIORITY CHANNEL | Ch A |
|---|---|
| NORMAL CHANNEL | Ch B<br>Ch C<br>Ch D<br>Ch E<br>⋮ |

52

| PRIORITY CHANNEL | Ch B<br>Ch C |
|---|---|
| NORMAL CHANNEL | Ch A<br>Ch D<br>Ch E<br>Ch F<br>⋮ |

52

MANAGEMENT DEVICE, TERMINAL DEVICE, MANAGEMENT METHOD, CHANNEL SCANNING METHOD, AND MEMORY MEDIUM THAT CARRY OUT CHANNEL SCANNING PROCESSING OF WIRELESS CIRCUIT

CROSS-REFERENCE TO RELATED APPLICATION

This application is based upon and claims the benefit of priority from the prior Japanese Patent Application No. 2015-107650, filed on May 27, 2015, the entire contents of which are incorporated herein by reference.

BACKGROUND

1. Field

The present invention relates to scanning techniques, and in particular relates to a management device, a terminal device, a management method, a channel scanning method, and a memory medium that carry out channel scanning processing of a wireless circuit.

2. Description of the Related Art

Mobile stations in wireless communication systems carry out an operation referred to as a channel scan. For example, a mobile station moves from a location where the mobile station communicates with abase station that operates on a predetermined channel to another location to thus enter an area of another base station that operates on a different channel. In this case, the mobile station searches for the channel of the base station by trying to receive a signal while changing the channels and thus finds the base station. However, when the number of channels to be scanned is large in the aforementioned situation, it takes time to scan the channels. In addressing such a situation, the mobile station calculates the distance between the mobile station and the base station and determines the order of the channels of the base station to be scanned in accordance with the distance (see, for example, patent document 1).

[Patent Document 1] Japanese Patent Application Laid-open No. 2013-211803

When the mobile station determines the order of the channels to be scanned on the basis of the distance from the base station, the mobile station has to have the positional information and the channel information of the base stations stored in advance. In that case, when the arrangement of the base stations changes, or when the channels on which the base stations operate change, the information stored in the mobile station needs updating.

SUMMARY

To address the aforementioned issue, a management device according an aspect of an embodiment includes a reception unit that receives positional information of a terminal device from the terminal device via a base station device that uses at least one of a plurality of channels, a generation unit that generates channel information related to a channel in scan processing of the terminal device on the basis of the positional information received by the reception unit, and a transmission unit that transmits the channel information generated by the generation unit to the terminal device via the base station device.

Another aspect of an embodiment provides a terminal device. The terminal device wirelessly communicates with a base station device that uses at least one of a plurality of channels, and includes a transmission unit that transmits positional information of the terminal device to a management device via the base station device, a reception unit that receives, via the base station device, channel information related to a channel in scan processing from the management device to which the transmission unit has transmitted the positional information, and a scan unit that carries out the scan processing of the channels on the basis of the channel information received by the reception unit. The positional information transmitted by the transmission unit is used to generate the channel information in the management device.

A yet another aspect of an embodiment provides a management method. The management method includes the steps of receiving positional information of a terminal device from the terminal device via a base station device that uses at least one of a plurality of channels, generating channel information related to a channel in scan processing of the terminal device on the basis of the received positional information, and transmitting the generated channel information to the terminal device via the base station device.

A still another aspect of an embodiment provides a method of scanning channels. This is a method of scanning channels in a terminal device that wirelessly communicates with a base station device that uses at least one of a plurality of channels, and the method includes the steps of transmitting positional information of the terminal device to a management device via the base station device, receiving, via the base station device, channel information related to a channel in scan processing from the management device to which the positional information has been transmitted, and carrying out the scan processing of the channels on the basis of the received channel information. The positional information transmitted in the step of transmitting is used to generate the channel information in the management device.

It is to be noted that any optional combination of the above-described constituent elements and any embodiment obtained by transforming what is expressed by the present embodiments into a method, an apparatus, a system, a recording medium, a computer program, and so on are also effective as other aspects of the present embodiments.

BRIEF DESCRIPTION OF THE DRAWINGS

FIG. 8 illustrates a data structure of a database stored in the scan unit illustrated in FIG. 7;

FIG. 13 illustrates a data structure of a database stored in the storage unit according to Example 2;

DETAILED DESCRIPTION

Figure 1:
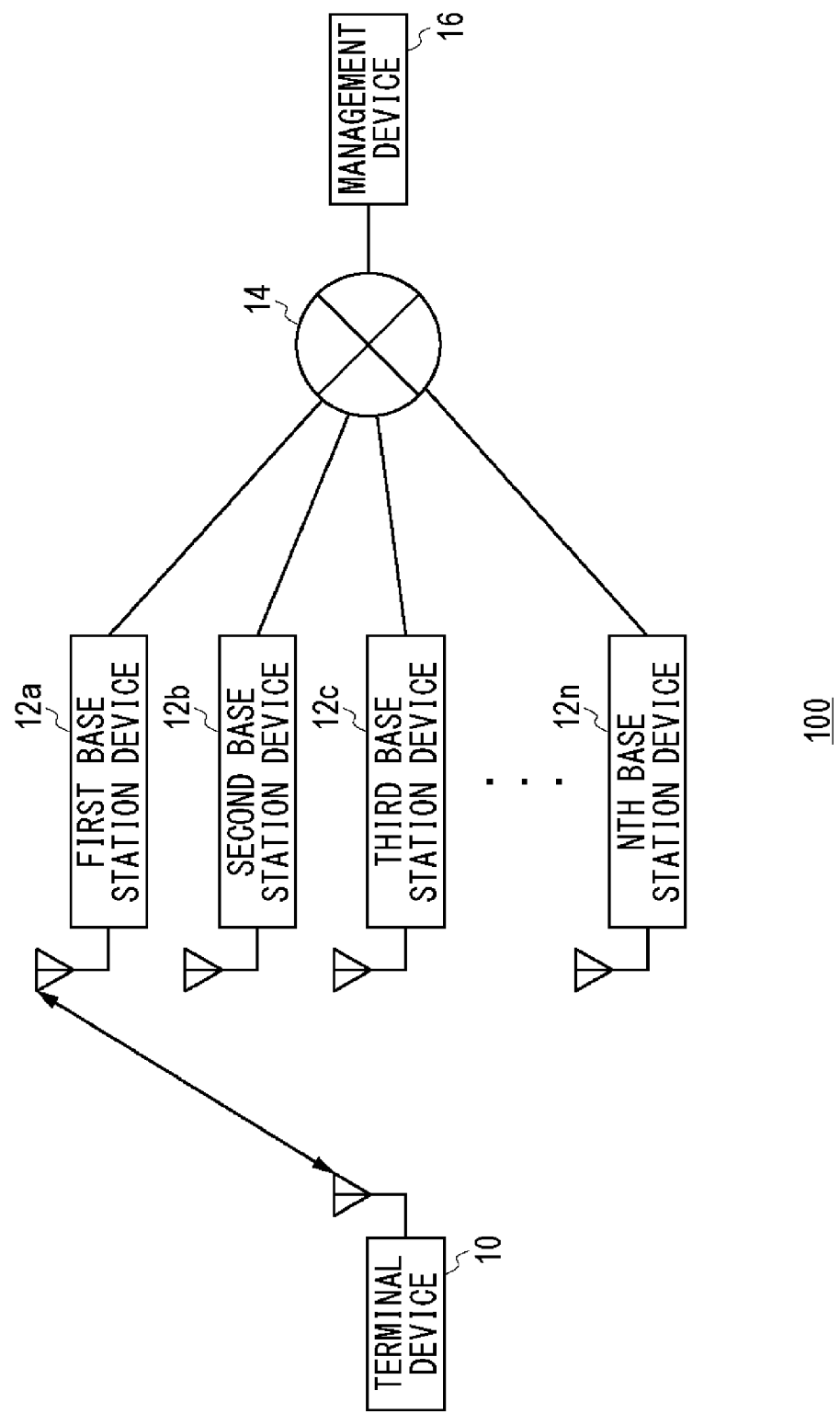
FIG. 1 illustrates a configuration of a communication system according to a first embodiment.

The invention will now be described by reference to the preferred embodiments. This does not intend to limit the scope of the present invention, but to exemplify the invention.

EXAMPLE 1

Prior to describing the present invention in concrete terms, an overview will be given first. Example 1 relates to a communication system in which a plurality of base station devices are installed and a terminal device connects to one of the plurality of base station devices and engages in wireless communication. A plurality of channels are defined in the communication system, and the center frequencies of the respective channels differ from one another. Each of the base station devices operates on one of the channels and communicates with a terminal device on that channel. A terminal device detects the status of each channel even when the terminal device is connected to a base station device on a given channel. This detection processing is also referred to as a channel scan, and the channel scan allows the presence of base station devices that operate on respective channels to be detected. The result of the channel scan is used, for example, for the terminal device to select a base station device to which the terminal device is to connect.

To speed up the channel scan, as described above, the order of the channels to be scanned is determined on the basis of the distance between the terminal device and the base station device with the use of information on the base station devices stored in the terminal device. In such a case, when the arrangement of the base station devices changes, or when the channels on which the base station devices operate change, the information on the base station devices stored in the terminal device needs updating, which makes a flexible operation difficult. In addition, when the order of the channels is determined on the basis of the distance, obstruction caused by a three-dimensional obstacle is not taken into consideration. In addressing the above, the present example carries out the following processing.

A management device is connected to base station devices via a network. The management device stores a database indicating a relation between positional information and channels to be used in priority when a channel scan is carried out (hereinafter, referred to as priority channels). The terminal device transmits positional information to the management device via a base station device and the network. Upon receiving the positional information, the management device selects a priority channel by referring to the database. The management device transmits information indicating the selected priority channel (hereinafter, referred to as channel information) to the terminal device via the network and the base station device. Upon receiving the channel information, the terminal device sets the priority channel included in the channel information and carries out channel scanning processing.

The database is stored in the management device. Thus, even when the arrangement of the base station devices changes, or even when the operation of the channels changes, only the database needs modifying, which enables a flexible operation. In addition, information on three-dimensional obstacles or the like is reflected on the relation stored in the database, and thus obstruction caused by a three-dimensional obstacle can be taken into consideration.

FIG. 1 illustrates a configuration of a communication system 100 according to Example 1. The communication system 100 includes a terminal device 10, a first base station device 12a, a second base station device 12b, a third base station device 12c, an Nth base station device 12n, a network 14, and a management device 16, and the first to Nth base station devices 12a to 12n are collectively referred to as base station devices 12.

The terminal device 10 corresponds to a wireless communication system and connects to the base station devices 12, which will be described later. Examples of the wireless communication system include wireless systems for business use and portable telephone systems. These are publicly known techniques, and thus descriptions thereof will be omitted herein. In order to simplify the description, FIG. 1 illustrates only a single terminal device 10, but a plurality of terminal devices 10 may be included in the communication system 100.

Each of the plurality of base station devices 12 corresponds at one end to a wireless communication system identical to the terminal device 10 and can connect to the terminal device 10. In addition, each of the base station devices 12 connects to the network 14 at the other end. Each of the base station devices 12 operates on one of a plurality of channels defined in the communication system 100. For example, mutually different channels are set in two or more base station devices 12 disposed proximal to each other. In addition, as illustrated in FIG. 1, when the terminal device 10 is connected to the first base station device 12a, the channel set in the first base station device 12a is used in the terminal device 10 and the first base station device 12a. Channels are communication paths for establishing communications between the terminal device 10 and the base station devices 12 and are identified by the center frequencies, the time, or the codes. Herein, the channels are identified by the center frequencies.

The network 14 is connected to the base station devices 12 and connects to the management device 16. The network 14 transmits and receives data among various devices. The network 14 may be implemented by any desired network and may, for example, be a wired network, a wireless network, or a combination thereof. Such a configuration enables the terminal device 10 to communicate with a communication device (not illustrated) via a base station device 12 and the network 14. The communication device (not illustrated) may be a device directly connected to the network 14 or may be another terminal device 10 connected to one of the base station devices 12. The communication may be telephonic communication, data communication, or the like.

The management device 16 communicates with the terminal device 10 via the network 14 and a base station device 12. The management device 16 may be included in one of the base station devices 12. The management device 16 stores a database, and the database indicates a relation between positional information and priority channels. The database will be described later in detail. The management device 16 receives positional information of the terminal device 10 that has been measured by the terminal device 10 via a base station device 12 and the network 14. The management device 16 selects, from the database, a priority channel corresponding to the received positional information. The management device 16 generates channel information on the basis of the selected priority channel and transmits the channel information to the terminal device 10 via the network 14 and the base station device 12. The terminal device 10 receives the channel information. The terminal device 10 sets the priority channel included in the channel information and carries out channel scanning processing at a timing at which the terminal device 10 is not in communication with the base station device 12.

Figure 2:
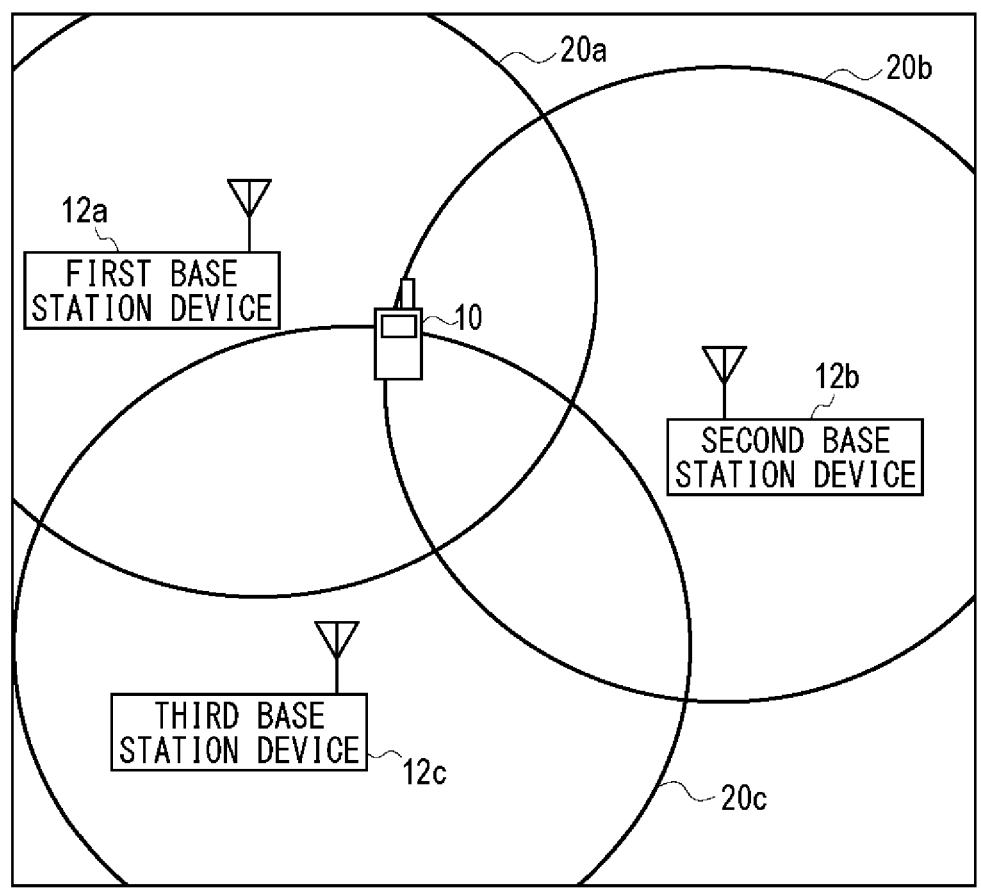
FIG. 2 illustrates an arrangement of base station devices in the communication system illustrated in FIG. 1.

FIG. 2 illustrates an arrangement of the base station devices 12 in the communication system 100. As an example, the first base station device 12a to the third base station device 12c are arranged. In addition, an area in which the terminal device 10 can communicate with the first base station device 12a, or in other words, an area in which the terminal device 10 can receive a signal from the first base station device 12a is indicated as a first communication-available area 20a. In a similar manner, a second communication-available area 20b is indicated for the second base station device 12b, and a third communication-available area 20c is indicated for the third base station device 12c. The first communication-available area 20a, the second communication-available area 20b, and the third communication-available area 20c are collectively referred to as communication-available areas 20. In the illustrated situation, the terminal device 10 can communicate with any one of the first base station device 12a to the third base station device 12c. The network 14 and the management device 16 illustrated in FIG. 1 are omitted in FIG. 2.

Figures 3, 4A, 4B:
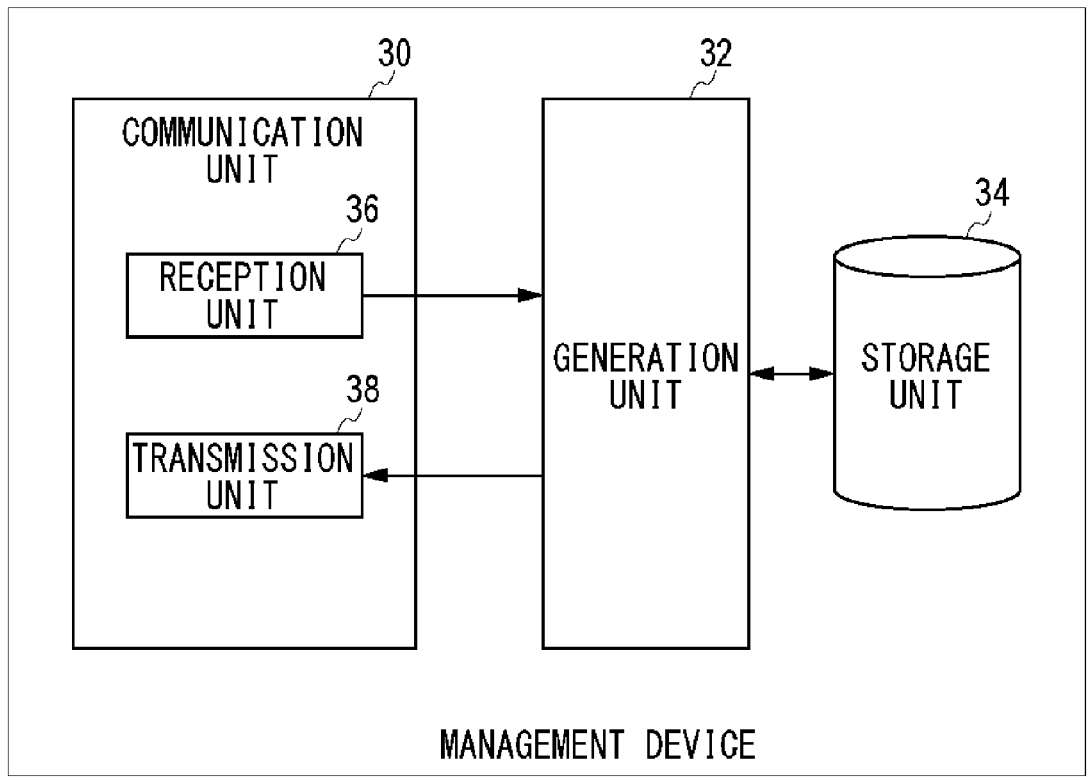
FIG. 3 illustrates a configuration of the management device illustrated in FIG. 1.
FIGS. 4A and 4B illustrate formats of signals transmitted and received in the communication system illustrated in FIG. 1.

FIG. 3 illustrates a configuration of the management device 16. The management device 16 includes a communication unit 30, a generation unit 32, and a storage unit 34, and the communication unit 30 includes a reception unit 36 and a transmission unit 38. The generation unit 32 generates a signal for requesting the terminal device 10 to transmit positional information (hereinafter, referred to as a positional information request). The positional information request is generated periodically for a single terminal device 10. In addition, the positional information request includes information for identifying a target terminal device 10 (hereinafter, referred to as terminal information). The generation unit 32 outputs the positional information request to the transmission unit 38. The transmission unit 38 receives the positional information request from the generation unit 32. The transmission unit 38 transmits the positional information request to the terminal device 10 indicated by the terminal information via the network 14 (not illustrated) and a base station device 12 (not illustrated). At this point, the base station device 12 may, for example, be a base station device 12 to which the terminal device 10 is connected and that uses at least one of a plurality of channels.

After the transmission unit 38 has transmitted the positional information request, the reception unit 36 receives positional information of the terminal device 10 from the terminal device 10 via the base station device 12 used to transmit the positional information request. At this point, the reception unit 36 also receives information on a priority channel set in the terminal device 10 (hereinafter, referred to as operating scan information). The reception unit 36 outputs the positional information and the operating scan information to the generation unit 32.

FIGS. 4A and 4B illustrate formats of signals transmitted and received in the communication system 100. As illustrated in FIGS. 4A and 4B, each signal is constituted sequentially by "command," "parameter 1," and "parameter 2." "Command" contains information indicating the type of the signal, and "parameter 1" and "parameter 2" contain values corresponding to each command. Aside from such a format, the signals may also contain terminal information. FIG. 4A illustrates the format of positional information that the reception unit 36 receives. "Command" contains a "positional information response," and "parameter 1" contains the "positional information." The positional information is defined by the latitude and the longitude. "Parameter 2" contains the operating scan information. In this example, the operating scan information is indicated as "Ch A." FIG. 4B will be described later. Refer back to FIG. 3.

The generation unit 32 receives the positional information and the operating scan information from the reception unit 36. On the basis of the positional information, the generation unit 32 acquires information on the priority channel by referring to the database stored in the storage unit 34. When the acquired information on the priority channel matches the information on the priority channel in the operating scan information, the generation unit 32 stops the processing. Meanwhile, when the acquired information on the priority channel does not match the information on the priority channel in the operating scan information, the generation unit 32 generates channel information related to channels in the scan processing of the terminal device 10. This channel information indicates the priority channel that is to be used in priority when the terminal device 10 carries out the scan processing and that has been acquired from the database.

FIG. 4B illustrates the format of the channel information generated by the generation unit 32. "Command" contains a "priority channel specification," and "parameter 1" contains the "priority." For example, the priority marked as 1 indicates the highest priority ranking. "Parameter 2" contains information on the priority channel. In this example, "Ch B," which is different from "Ch A" in the operating scan information, is indicated. Refer back to FIG. 3. In this manner, the generation unit 32 generates the channel information related to channels in the scan processing of the terminal device 10 on the basis of the positional information received by the reception unit 36. The generation unit 32 outputs the channel information to the transmission unit 38.

Figure 5:
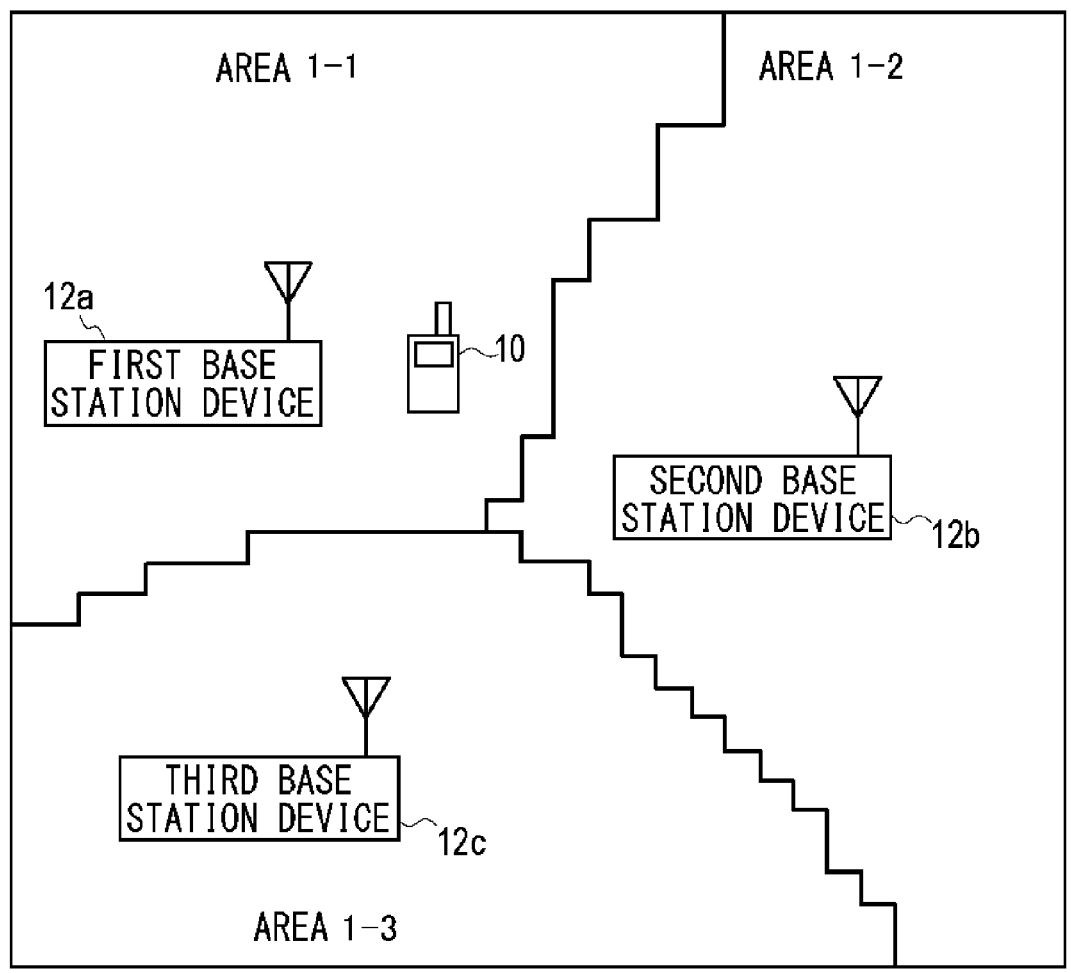
FIG. 5 illustrates an overview of a database stored in the storage unit illustrated in FIG. 3.

As described above, the storage unit 34 stores a database, and this database indicates a relation between the positional information and the priority channels and is referred to when the generation unit 32 generates channel information on the basis of the positional information. FIG. 5 illustrates an overview of the database stored in the storage unit 34. For simplifying the description, the first base station device 12a to the third base station device 12c are arranged, as in FIG. 2. Areas for the first base station device 12a to the third base station device 12c are divided in accordance with the distance, and thus an area 1-1, an area 1-2, and an area 1-3 are formed. For example, the distance from the first base station device 12*a* and the distance from the second base station device 12*b* are equal on the boundary between the area 1-1 and the area 1-2. The boundary between the area 1-2 and the area 1-3 and the boundary between the area 1-3 and the area 1-1 are defined in a similar manner.

Figures 6, 7:
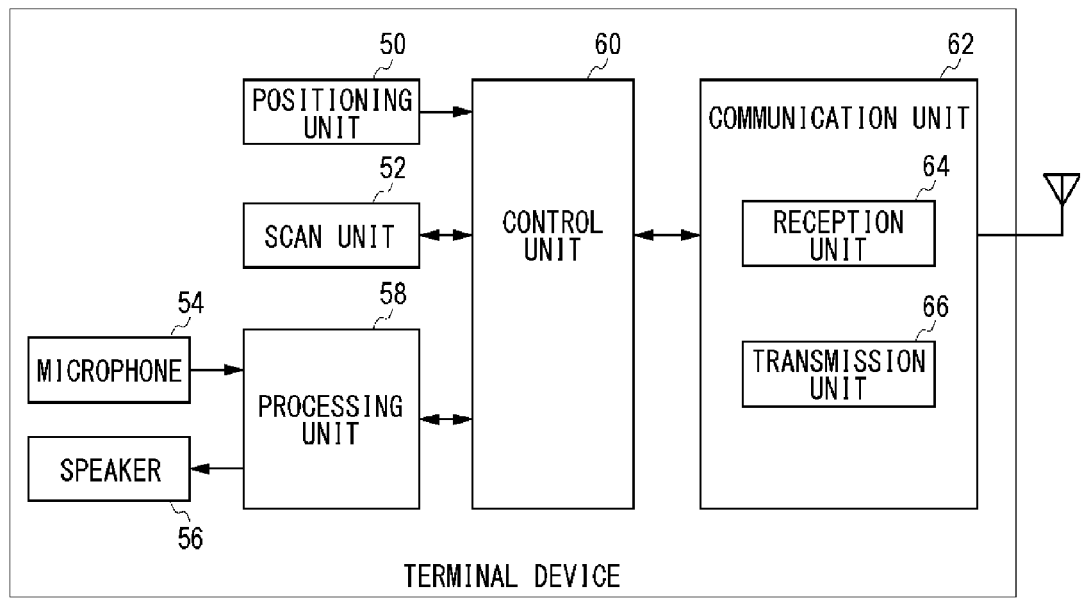
FIG. 6 illustrates a data structure of the database stored in the storage unit illustrated in FIG. 3.
FIG. 7 illustrates a configuration of the terminal device illustrated in FIG. 1.

The database stored in the storage unit 34 is configured as illustrated in FIG. 6 for the areas 1-1 to 1-3 defined as described above. FIG. 6 illustrates a data structure of the database stored in the storage unit 34. As illustrated in FIG. 6, the database includes an area column 200, a base station device column 202, and a priority channel column 204. The area column 200 lists the area 1-1, the area 1-2, and the area 1-3. Positional information for defining the range of the area 1-1 is indicated for the area 1-1. The same applies to the area 1-2 and the area 1-3. The base station device column 202 lists information on the base station devices 12 forming the respective areas. The priority channel column 204 lists the channels used by the respective base station devices 12 for communication, and these channels corresponds to the priority channels for the terminal device 10. Such a database indicates that the terminal device 10 illustrated in FIG. 5 is in the area 1-1 and that the priority channel is "Ch A." Refer back to FIG. 3.

The transmission unit 38 receives the channel information from the generation unit 32. The transmission unit 38 transmits the received channel information to the terminal device 10 via a base station device 12. This transmission is carried out in a similar manner to the transmission of the positional information request.

This configuration can be implemented in hardware, such as a CPU of a computer, a memory, and an LSI, as desired or in software, such as a program loaded onto a memory. The configuration is depicted herein in the form of functional blocks implemented through cooperation of such hardware and software. Thus, it is to be understood by a person skilled in the art that these functional blocks can be implemented in various forms, namely, solely in hardware, solely in software, or through a combination of hardware and software.

FIG. 7 illustrates a configuration of the terminal device 10. The terminal device 10 includes a positioning unit 50, a scan unit 52, a microphone 54, a speaker 56, a processing unit 58, a control unit 60, and a communication unit 62, and the communication unit 62 includes a reception unit 64 and a transmission unit 66. As described above, the terminal device 10 can wirelessly communicate with a base station device 12 that uses at least one of a plurality of channels.

The microphone 54 receives a sound from a user and outputs the sound in the form of an electric signal (hereinafter, referred to as an audio signal) to the processing unit 58. The speaker 56 receives an electric signal indicating a sound (hereinafter, also referred to as an audio signal) from the processing unit 58 and outputs the sound. Thus, the microphone 54 and the speaker 56 correspond to an interface for the user to carry out telephonic communication. The interface for the user may also include a button or the like for receiving a user operation, but description thereof will be omitted herein.

The processing unit 58 receives an audio signal from the microphone 54 and outputs the audio signal to the speaker 56. The processing unit 58 carries out audio signal processing on the audio signal. The audio signal processing may be implemented with the use of any publicly known technique, and thus description thereof will be omitted herein. The processing unit 58, along with the control unit 60 and the communication unit 62, establishes wireless communication for telephonic communication. The communication unit 62 transmits and receives signals to and from the base station devices 12 (not illustrated).

The reception unit 64 receives a positional information request from the management device 16 via the network 14 (not illustrated) and a base station device 12 (not illustrated). The reception unit 64 outputs the positional information request to the control unit 60. The positioning unit 50 is equipped with a positioning function of the global positioning system (GPS) and measures the position of the terminal device 10. The positional information obtained as a result of measuring the position is indicated by the latitude and the longitude. The positioning unit 50 outputs the positional information to the control unit 60.

Upon receiving the positional information request from the reception unit 64, the control unit 60 acquires information on the priority channel set in the scan unit 52. As described above, the acquired information on the priority channel corresponds to the operating scan information. In addition, the control unit 60 generates a signal that contains the positional information received from the positioning unit 50 and the operating scan information. This signal has a format as illustrated in FIG. 4A. The control unit 60 outputs the generated signal to the transmission unit 66. The transmission unit 66 transmits the signal received from the control unit 60, or in other words, the positional information and the operating scan information of the terminal device 10 to the management device 16 via the base station device 12 and the network 14. As described above, this positional information is used to generate channel information in the management device 16.

The reception unit 64 receives channel information from the management device 16, to which the transmission unit 66 has transmitted the positional information, via the network 14 and the base station device 12. As described above, the channel information is information related to channels in the scan processing and has a format as illustrated in FIG. 4B. The reception unit 64 outputs the channel information to the control unit 60. The control unit 60 receives the channel information from the reception unit 64. Upon receiving the channel information, the control unit 60 sets the priority channel in the scan unit 52.

The scan unit 52 carries out the channel scanning processing at a timing at which the processing unit 58, the control unit 60, and the communication unit 62 are not in communication. In the channel scanning processing, one of a plurality of channels is set, and a signal is received for a certain period of time on the set channel. When a received signal is a signal from a base station device 12, the scan unit 52 acquires identification information that is included in the signal and that allows the base station device 12 to be identified (hereinafter, referred to as base station information) and stores the base station information along with the reception power of the signal. In addition, the scan unit 52 repeats such processing while switching the channels. When a priority channel is set by the control unit 60, the scan unit 52 scans the priority channel at an increased frequency when carrying out the channel scanning processing. For example, the scan unit 52 scans the priority channel first, and when a signal is weak or when no signal is detected, the scan unit 52 scans normal channels. Alternatively, the scan unit 52 scans the priority channel a predetermined number of times set as the upper limit, and when the scan unit 52 needs to further scan the channels, the scan unit 52 may scan normal channels. In this manner, the scan unit 52 carries out the channel scanning processing on the basis of the channel information received by the reception unit 64.

FIG. 8 illustrates a data structure of a database stored in the scan unit 52. For example, "Ch B" is set as a priority channel, and "Ch A," "Ch C," and so on, which are channels other than the priority channel, are set as normal channels. When a new priority channel is set by the control unit 60, the scan unit 52 sets the channel that has been set as the priority channel as a normal channel.

Figure 9A:
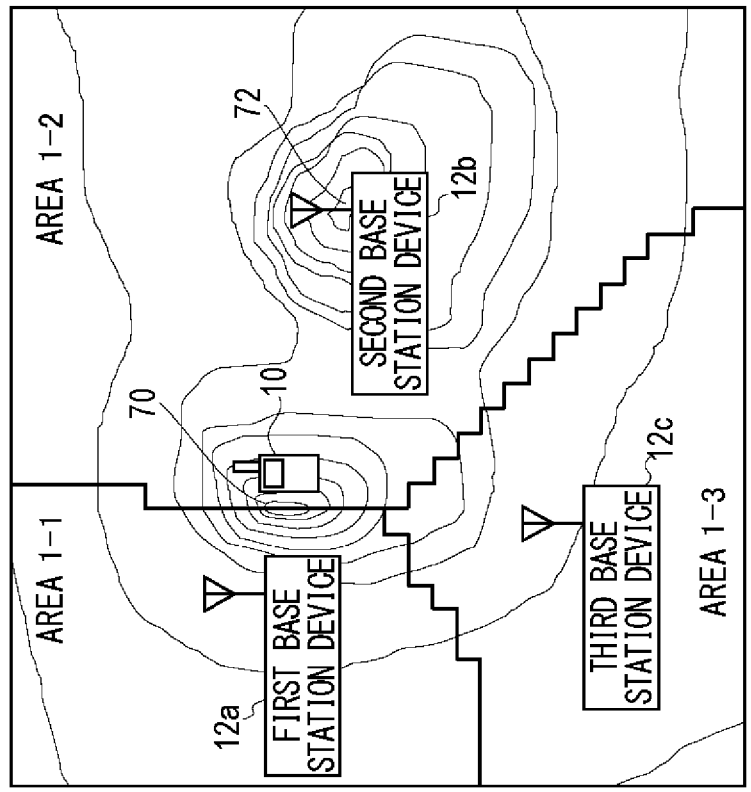
FIGS. 9A and 9B illustrate another configuration of the communication system illustrated in FIG. 1.
Figure 9B:
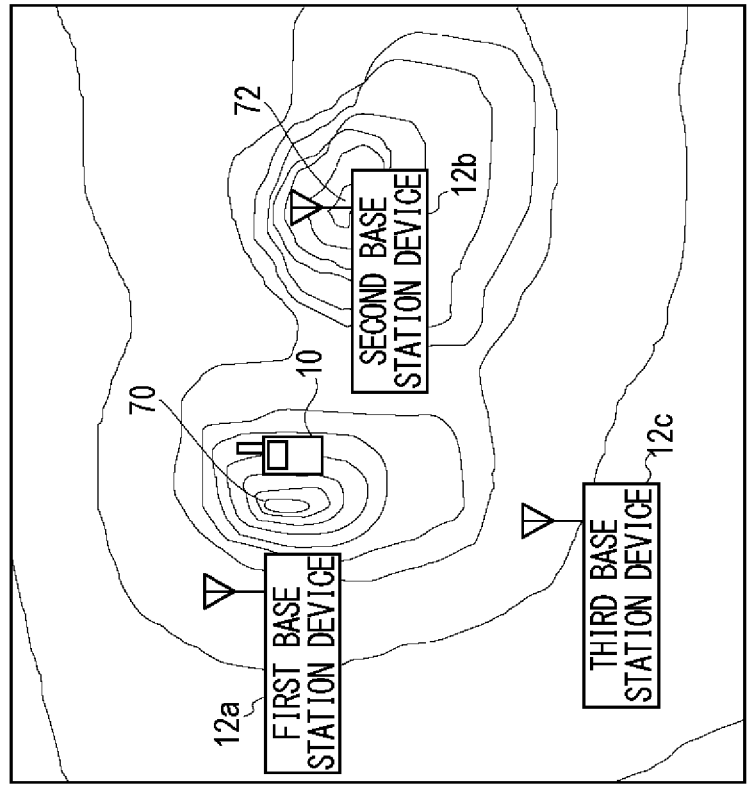

Hereinafter, another example of the database stored in the storage unit 34 will be described. In FIG. 5, the boundaries among the areas are defined in accordance with the positional relation of the first base station device 12a to the third base station device 12c, and the actual geographical features are not taken into consideration. Now, an influence of a three-dimensional obstacle is taken into consideration. FIGS. 9A and 9B illustrate another configuration of the communication system 100. FIG. 9A illustrates the arrangement of the base station devices 12 in the communication system 100 and the actual geographical features. The arrangement of the first base station device 12a to the third base station device 12c and the presence of the terminal device 10 are the same as those illustrated in FIG. 2. Meanwhile, Mt. M 70 is present between the first base station device 12a and the terminal device 10, and Mt. M 70 is an obstacle between the first base station device 12a and the terminal device 10. Therefore, communication on "Ch A" is difficult to establish between the first base station device 12a and the terminal device 10. The second base station device 12b is located at the top of Mt. N 72, and the terminal device 10 can be seen from the second base station device 12b. Therefore, communication on "Ch B" is easy to establish between the second base station device 12b and the terminal device 10.

FIG. 9B illustrates areas defined with the geographical features illustrated in FIG. 9A taken into consideration. Here, a boundary between different priority channels is arranged at a position where the difference in the reception power on the different priority channels is smaller than a threshold. The reception power may be based on the measured data at each location or may be derived through a computer simulation or the like. To be more specific, the first base station device 12a transmits a signal on "Ch A," and the second base station device 12b transmits a signal on "Ch B." These signals can be signals on different priority channels. The boundary between the area 1-1 and the area 1-2 is arranged at a position where the difference between the reception power of the signal on "Ch A" and the reception power of the signal on "Ch B" is smaller than the threshold. This boundary corresponds to a boundary between different priority channels. In addition, an example of the position where the difference between the reception power of the signal on "Ch A" and the reception power of the signal on "Ch B" is smaller than the threshold is a position where the reception power of the signal on "Ch A" is equal to the reception power of the signal on "Ch B." The boundary between the area 1-2 and the area 1-3 and the boundary between the area 1-3 and the area 1-1 are also defined in a similar manner.

As such a database is stored in the storage unit 34, the management device 16 instructs the terminal device 10 to set "Ch B," which is the priority channel in the area 1-2. In operation, a change in the environment can be addressed by editing the database stored in the storage unit 34. For example, when the second base station device 12b is temporarily out of service, the database is modified so as to expand the area 1-1 and the area 1-3. In addition, the areas can be defined with not only the geographical features but also the transmission power of the base station devices 12 taken into consideration.

Figure 10:
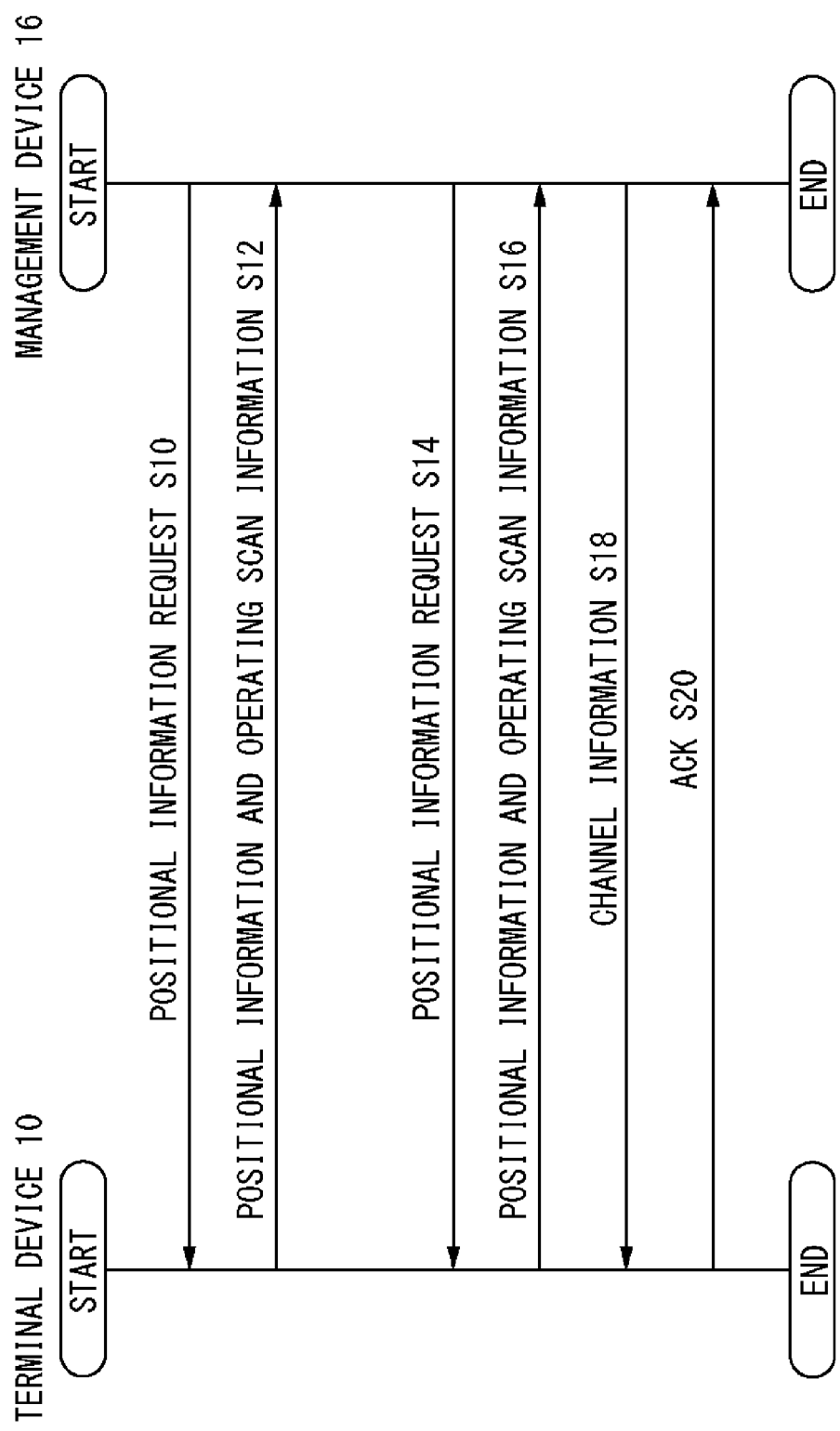
FIG. 10 is a sequence diagram illustrating a setting procedure in the communication system illustrated in FIG. 1.

An operation of the communication system 100 configured as described above will be described. FIG. 10 is a sequence diagram illustrating a setting procedure in the communication system 100. The management device 16 transmits a positional information request to the terminal device 10 (S10). The terminal device 10 transmits positional information and operating scan information to the management device 16 (S12). The management device 16 transmits a positional information request to the terminal device 10 (S14). The terminal device 10 transmits positional information and operating scan information to the management device 16 (S16). The management device 16 transmits channel information to the terminal device 10 (S18). The terminal device 10 transmits ACK to the management device 16 (S20).

Figure 11:
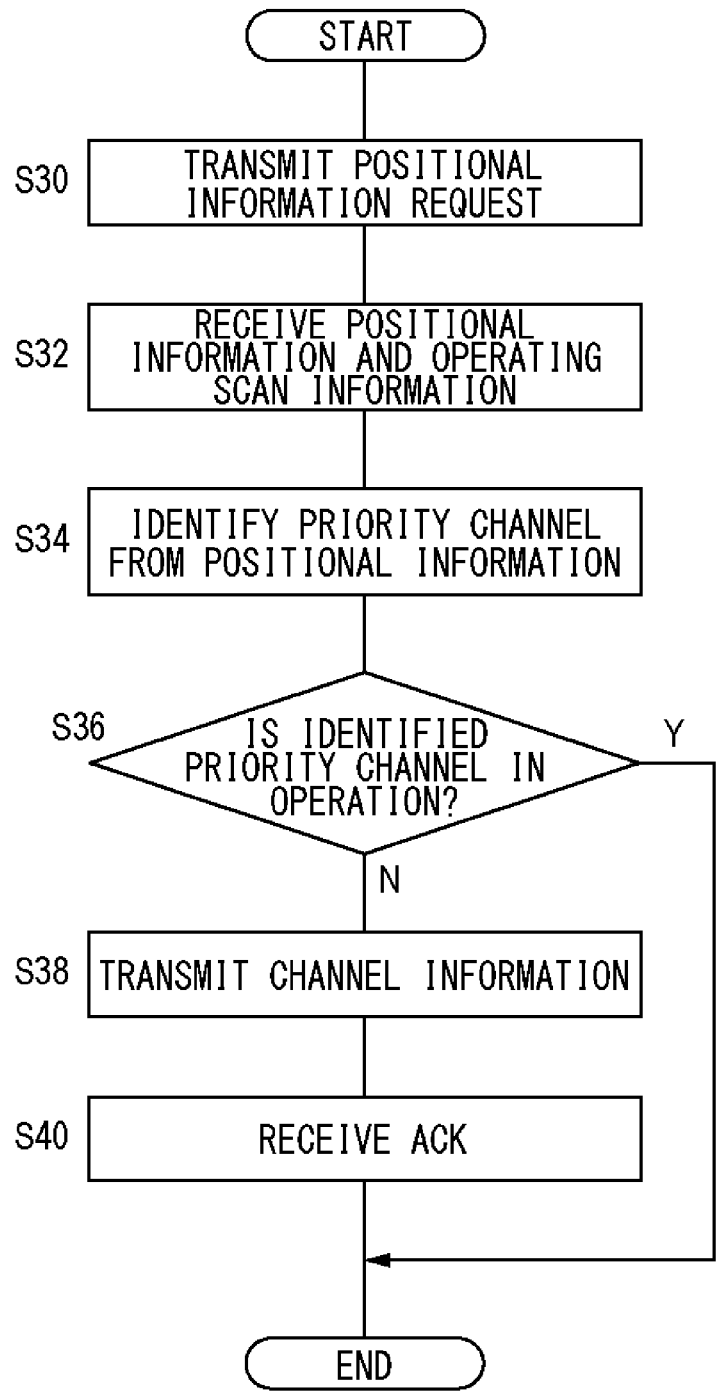
FIG. 11 is a flowchart illustrating a setting procedure in the management device illustrated in FIG. 3.

FIG. 11 is a flowchart illustrating a setting procedure of the management device 16. The transmission unit 38 transmits a positional information request (S30). The reception unit 36 receives positional information and operating scan information (S32). The generation unit 32 identifies a priority channel on the basis of the positional information (S34). When the identified priority channel is not in operation (N in S36), the transmission unit 38 transmits channel information (S38). The reception unit 36 receives ACK (S40). When the identified priority channel is in operation (Y in S36), the processing is terminated.

According to the present example, channel information related to channels in the scan processing of the terminal device is generated on the basis of the positional information of the terminal device, and the generated channel information is transmitted to the terminal device. Thus, the channels in the channel scanning processing of the terminal device can be determined in the management device. Since the channels in the channel scanning processing of the terminal device is determined in the management device, even when the arrangement or the operation of the base station devices changes, such a change can be handled only by modifying the processing of the management device. In addition, even when the arrangement or the operation of the base station devices changes, such a change can be handled only by modifying the processing of the management device. Thus, the channels in the channel scanning processing of the terminal device can be instructed flexibly.

With regard to the channels in the channel scanning processing of the terminal device, a priority channel to be used in priority when the terminal device carries out the scan processing is targeted, and thus a channel on which a signal is highly likely to be detected can be instructed. Since the channel on which a signal is highly likely to be detected is instructed, the channel scanning processing of the terminal device can be speeded up. In addition, since a database indicating the relation between the positional information and the priority channels is stored, even when the arrangement or the operation of the base station devices changes, such a change can be handled only by modifying the content of the database. Since the database is configured such that a boundary between different priority channels is arranged at a position where the difference in the reception power on the different priority channels is smaller than a threshold, an influence of a three-dimensional obstacle can be taken into consideration.

In addition, since the channel scanning processing is carried out on the basis of channel information from a base station device, the processing in the terminal device can be simplified. Since the channel scanning processing is carried out on the basis of channel information from a base station device, the channel scanning processing can be carried out flexibly. Since the channel scanning processing is carried out with an actual communication condition that a three-dimensional obstacle is present or the like taken into consideration, the probability of detecting a channel can be increased. In addition, even when the arrangement or the operation of the base station devices changes, only the content of the database is to be modified, which can render it unnecessary to collect the terminal device and overwrite the data.

EXAMPLE 2

Example 2 will now be described. As in Example 1, Example 2 relates to a communication system in which a management device notifies a terminal device of a priority channel and the terminal device sets the priority channel and then carries out channel scanning processing. In Example 1, a single priority channel is defined for a single area. Meanwhile, as described above, when a boundary between areas is set at a position where the reception powers of signals from two base station devices are close to each other, the signals from the two base station devices can be received at substantially equal reception powers in the vicinity of the boundary between the areas. Therefore, a priority channel may be set for each of the two areas at such a position. To handle such a situation, in Example 2, two priority channels are defined in the vicinity of a boundary between areas. A communication system 100, a management device 16, and a terminal device 10 according to Example 2 are of a similar type to those illustrated in FIG. 1, FIG. 3, and FIG. 7. The description herein centers on the differences.

Figure 12:
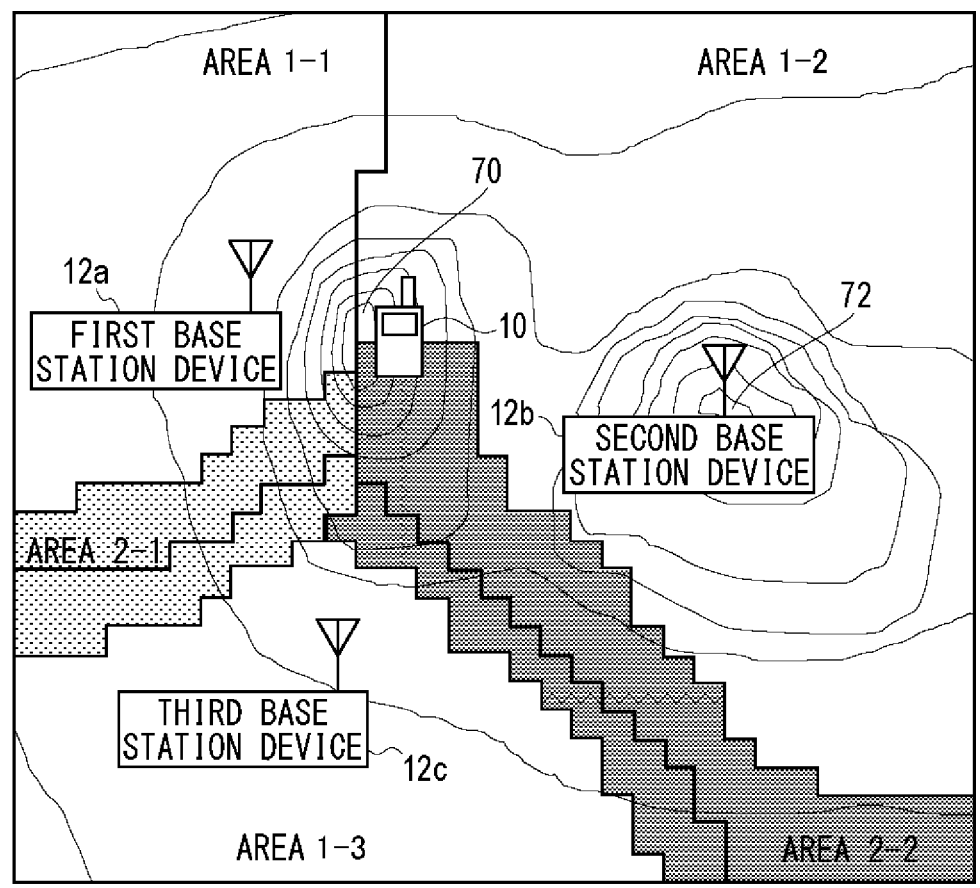
FIG. 12 illustrates an overview of a database stored in a storage unit according to Example 2.

FIG. 12 illustrates an overview of a database stored in a storage unit 34 according to Example 2. A first base station device 12a, a second base station device 12b, a third base station device 12c, the terminal device 10, Mt. M 70, Mt. N 72, an area 1-1, an area 1-2, and an area 1-3 are illustrated in a similar manner to those illustrated in FIG. 9B. Furthermore, in FIG. 12, an area 2-1 is arranged between the area 1-1 and the area 1-3, and an area 2-2 is arranged between the area 1-2 and the area 1-3. The area 2-1 and the area 2-2 are arranged so as to overlap the areas 1-1 to 1-3. For example, in the area 2-1, a signal on "Ch A" of the first base station device 12a can be received, and a signal on "Ch C" of the third base station device 12c can also be received. A similar situation applies to the area 2-2.

FIG. 13 illustrates a data structure of a database stored in the storage unit 34 according to Example 2. As illustrated in FIG. 13, the database includes an area 1 column 220, an area 2 column 222, a priority channel 1 column 224 and a priority channel 2 column 226. The area 1 column 220 lists the area 1-1, the area 1-2, and the area 1-3. As described above, positional information for defining the ranges of the areas is indicated for the area 1-1, the area 1-2, and the area 1-3. The area 2 column 222 lists the area 2-1, the area 2-2, and "none." To be more specific, the area 2-1 and "none" are arranged in the area 1-1; the area 2-2 and "none" are arranged in the area 1-2; and the area 2-1, the area 2-2, and "none" are arranged in the area 1-3. The priority channel 1 column 224 lists priority channels of higher priority ranking (priority), and the priority channel 2 column 226 lists priority channels of lower priority ranking. In the channel scanning processing of the terminal device 10, a priority channel of higher priority ranking is used most frequently, and a priority channel of lower priority ranking is used at the second highest frequency. In addition, in the channel scanning processing of the terminal device 10, the frequency of use of a normal channel is lower than the frequency of use of the aforementioned two. For example, the priority channel of the highest priority ranking is scanned first, and if more channels need scanning, the priority channel of the second highest priority ranking is scanned. When all of the priority channels have been scanned and still more channels need scanning, a normal channel is scanned. Alternatively, when the priority channel of the highest priority ranking is scanned a first predetermined number of times set as an upper limit and a signal is weak or no signal is detected, the priority channel of the second highest priority ranking may be scanned a second predetermined number of times set as an upper limit. Here, the first predetermined number of times has a larger numerical value than the second predetermined number of times.

With such a data structure of the database, channel information generated by the generation unit 32 illustrated in FIG. 3 indicates a plurality of priority channels that are to be used in priority when the terminal device 10 carries out the scan processing and that are of different priority ranking.

Figures 14, 15A, 15B:
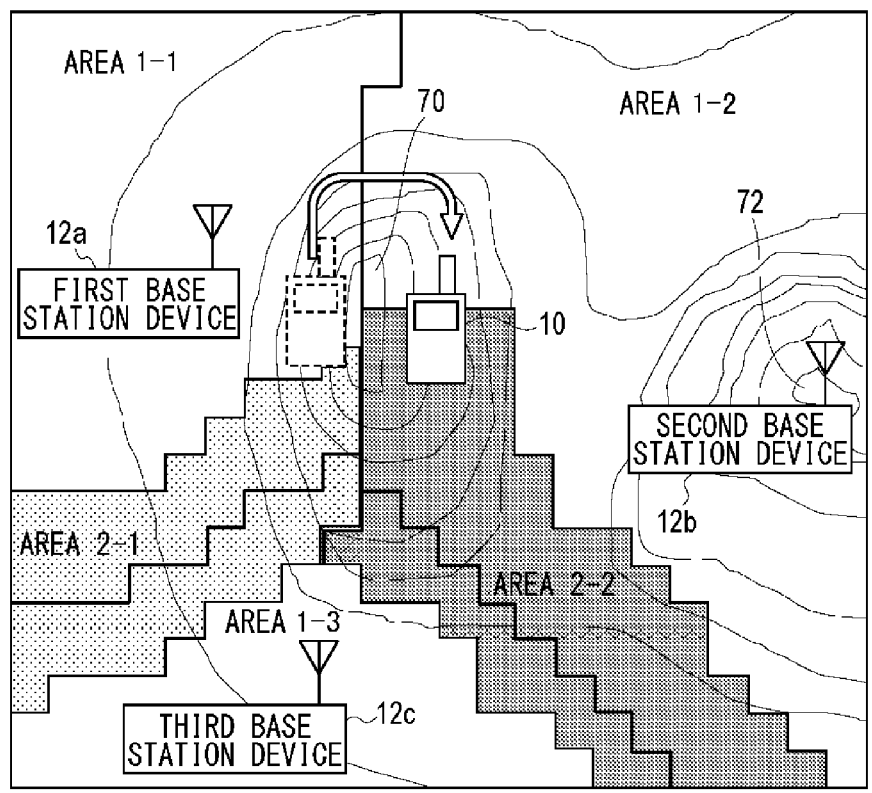
FIG. 14 illustrates a configuration in which a terminal device in a communication system according to Example 2 moves.
FIGS. 15A and 15B illustrate data structures of databases stored in a scan unit according to Example 2.

FIG. 14 illustrates a configuration in which the terminal device 10 in the communication system 100 according to Example 2 moves. The terminal device 10 moves from the area 1-1 to the area 1-2. In addition, the area 2-2 is also located in the area 1-2 to which the terminal device 10 moves. In such a case, the management device 16 issues an instruction to the terminal device 10 through channel information indicating that the priority channel 1 is "Ch B" and the priority channel 2 is "Ch C."

FIGS. 15A and 15B illustrate data structures of databases stored in the scan unit 52 according to Example 2. FIG. 15A illustrates a database used before the terminal device 10 moves in FIG. 14. Here, "Ch A" is set as the priority channel, and "Ch B," "Ch C," and so on, which are channels other than the priority channel, are set as normal channels. FIG. 15B illustrates the database used after the terminal device 10 moves in FIG. 14. Here, "Ch B" and "Ch C" are set as the priority channels, and "Ch A," "Ch D," and so on, which are channels other than the priority channels, are set as normal channels. Among the priority channels, the channel listed in a higher row has higher priority ranking.

Figure 16:
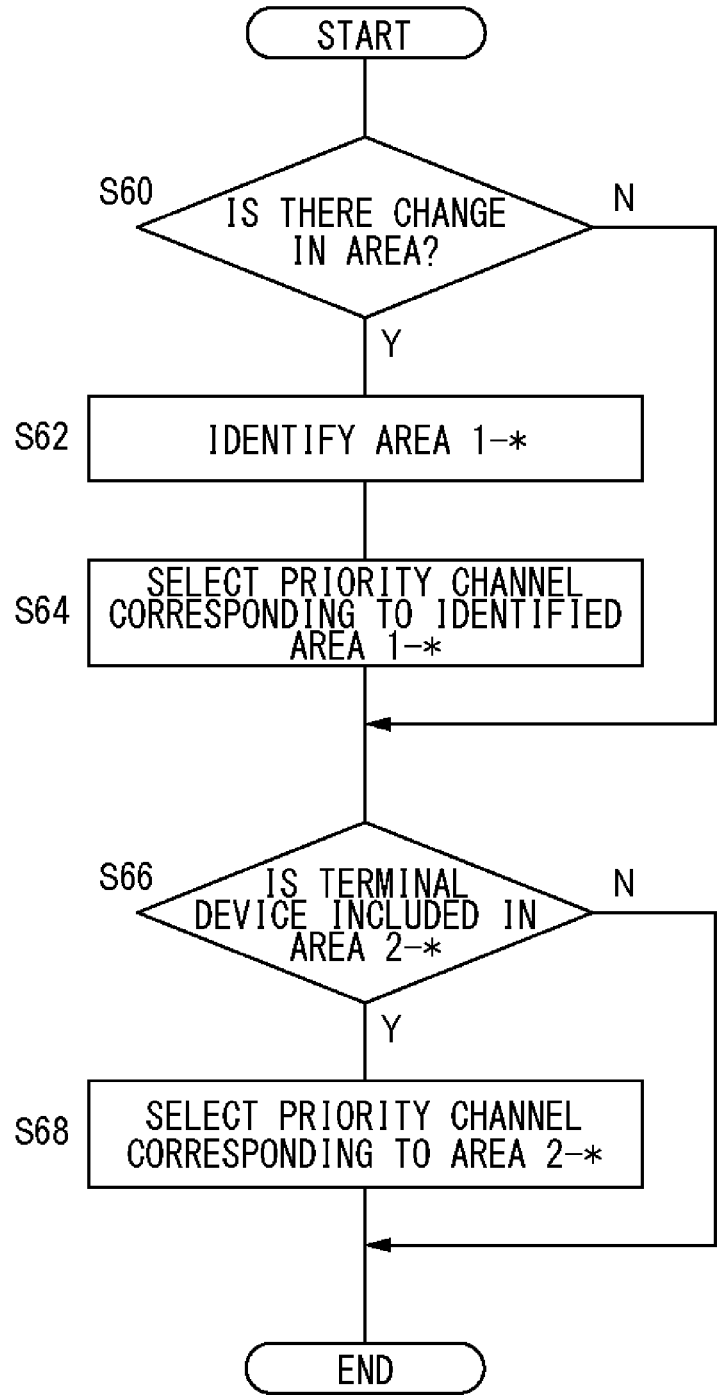
FIG. 16 is a flowchart illustrating a selection procedure in a management device according to Example 2.

An operation of the communication system 100 configured as described above will be described. FIG. 16 is a flowchart illustrating a selection procedure in the management device 16 according to Example 2. When there is change in the area (Y in S60), the generation unit 32 identifies the area 1-* (S62). The generation unit 32 selects a priority channel corresponding to the identified area 1-* (S64). When there is no change in the area (N in S60), step 62 and step 64 are skipped. When the terminal device 10 is included in an area 2-* (Y in S66), the generation unit 32 selects a priority channel corresponding to the area 2-* (S68). When the terminal device 10 is not included in an area 2-* (N in S66), the processing is terminated.

According to the present example, a plurality of priority channels are specified, and thus the possibility that a signal is detected on the priority channels can be increased as compared to a case in which a single priority channel is specified. In addition, channels used in the adjacent areas are set as the plurality of priority channels, and thus the channel scanning processing can be speeded up.

EXAMPLE 3

Example 3 will now be described. As in the above, Example 3 relates to a communication system in which a management device notifies a terminal device of a priority channel and the terminal device sets the priority channel and then carries out channel scanning processing. In the above, after the management device has transmitted a positional information request to the terminal device, the terminal device transmits positional information to the management device, and the management device transmits area information to the terminal device. In other words, a trigger for the start of the processing is transmitted from the management device. Meanwhile, in Example 3, a trigger for the start of the processing is transmitted from the terminal device. A communication system 100, a management device 16, and a terminal device 10 according to Example 3 are of a similar type to those illustrated in FIG. 1, FIG. 3, and FIG. 7. The description herein centers on the differences.

Upon receiving channel information from the reception unit 64, the control unit 60 illustrated in FIG. 7 acquires positional information from the positioning unit 50. Thereafter, the control unit 60 periodically acquires the positional information from the positioning unit 50 and determines whether the terminal device 10 has moved a predetermined distance or more from the position held when the channel information was input. When the terminal device 10 has moved a predetermined distance or more, the control unit 60 causes the transmission unit 66 to transmit positional information and operating scan information to the management device 16.

Figure 17:
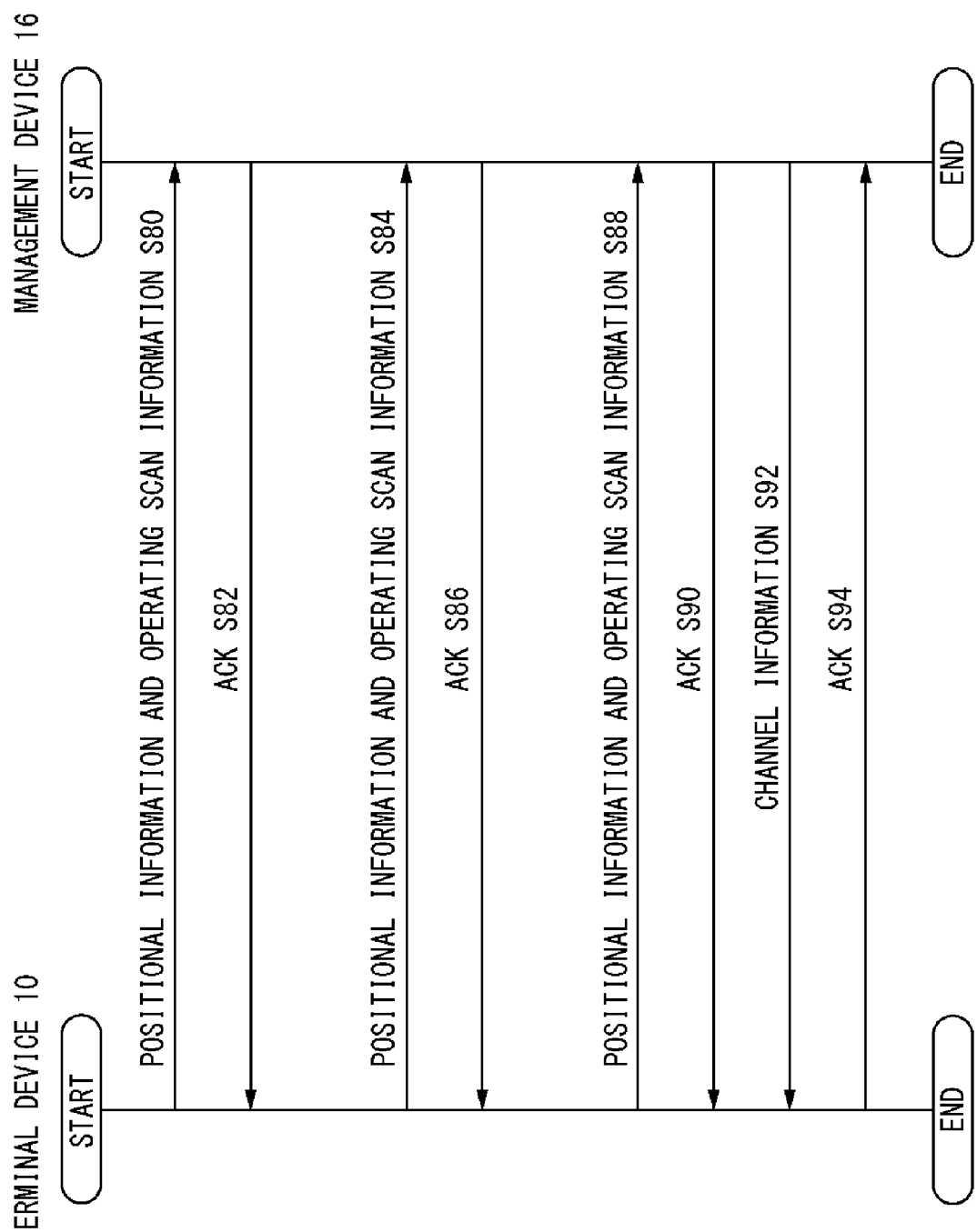
FIG. 17 is a sequence diagram illustrating a setting procedure in a communication system according to Example 3.

An operation of the communication system 100 configured as described above will be described. FIG. 17 is a sequence diagram illustrating a setting procedure in the communication system 100 according to Example 3. The terminal device 10 transmits positional information and operating scan information to the management device 16 (S80). The management device 16 transmits ACK to the terminal device 10 (S82). Upon moving a predetermined distance or more, the terminal device 10 transmits positional information and operating scan information to the management device 16 (S84). The management device 16 transmits ACK to the terminal device 10 (S86). Upon further moving a predetermined distance or more, the terminal device 10 transmits positional information and operating scan information to the management device 16 (S88). The management device 16 transmits ACK to the terminal device 10 (S90). The management device 16 transmits channel information to the terminal device 10 (S92). The terminal device 10 transmits ACK to the management device 16 (S94).

According to the present example, a trigger for the start of the processing is not transmitted from the management device, and thus the processing of the management device can be simplified. In addition, the terminal device transmits positional information to the management device upon moving a predetermined distance or more, and thus the terminal device can acquire channel information when it is highly likely that the priority channel has changed.

EXAMPLE 4

Example 4 will now be described. As in the above, Example 4 relates to a communication system in which a management device notifies a terminal device of a priority channel and the terminal device sets the priority channel and then carries out channel scanning processing. As in Example 1 and so on, in Example 4, the management device transmits a positional information request serving as a trigger for the start of the processing to the terminal device. In particular, when a failure in a base station device is detected, the management device updates the database and transmits a positional information request to the terminal device so as to set a priority channel corresponding to the updated database in the terminal device. A communication system 100 and a terminal device 10 according to Example 4 are of a similar type to those illustrated in FIG. 1 and FIG. 7. The description herein centers on the differences.

Figure 18:
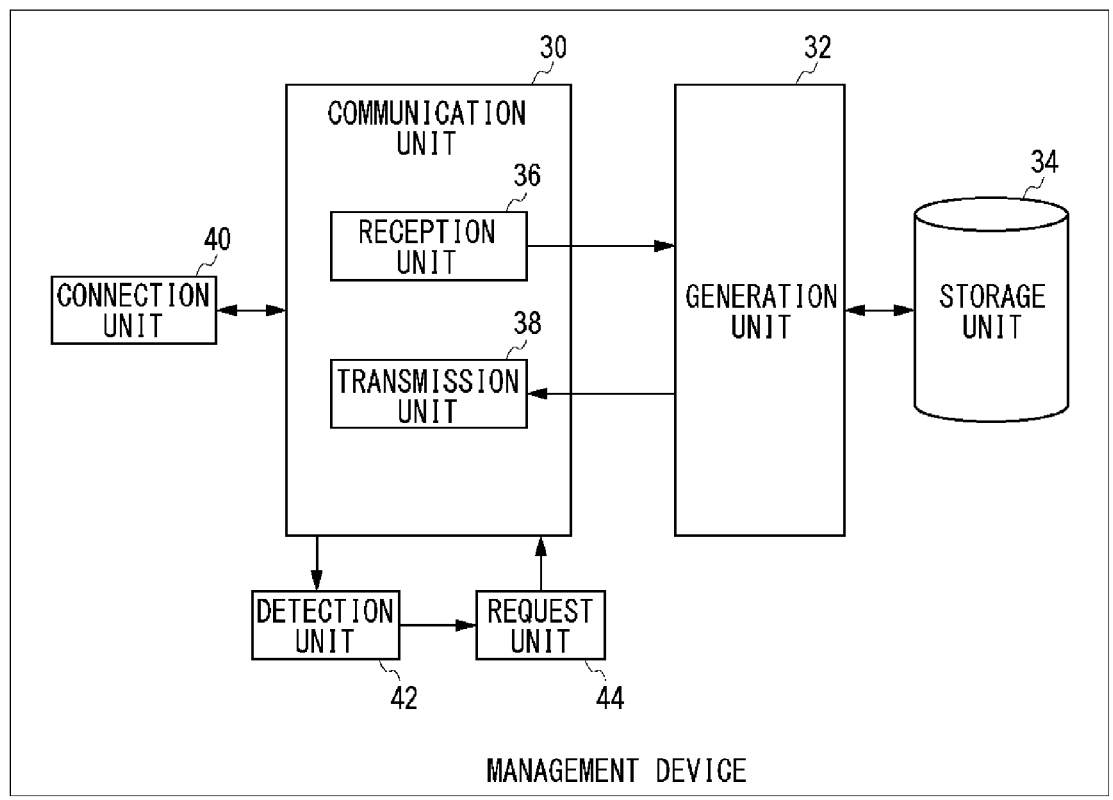
FIG. 18 illustrates a configuration of a management device according to Example 4.

FIG. 18 illustrates a configuration of a management device 16 according to Example 4. The management device 16 includes a communication unit 30, a generation unit 32, a storage unit 34, a connection unit 40, a detection unit 42, and a request unit 44. The communication unit 30 includes a reception unit 36 and a transmission unit 38. The connection unit 40 is connected to a network 14 (not illustrated) and connects to a plurality of base station devices 12 via the network 14. The connection unit 40 may also be included in the configuration of the management device 16 of the examples described above, but the connection unit 40 is omitted in the above.

The detection unit 42 detects a failure that has occurred in any one of the plurality of base station devices 12 connected via the connection unit 40. For example, the detection unit 42 transmits a signal to each of the base station devices 12 via the network 14. When the detection unit 42 receives a response to the transmitted signal within a predetermined period of time, the detection unit 42 confirms that no failure has occurred in the base station device 12 that has transmitted the response. Meanwhile, when the detection unit 42 does not receive a response to the transmitted signal within a predetermined period of time, the detection unit 42 determines that a failure has occurred in the base station device 12 that does not transmit the response. The detection unit 42 informs the request unit 44 of an occurrence of a failure.

When the detection unit 42 has detected a failure, the request unit 44 instructs the transmission unit 38 to transmit a positional information request to the terminal device 10 via a base station device 12 other than the base station device 12 in which the failure has occurred. The transmission unit 38 transmits the positional information request in accordance with the instruction from the request unit 44. Upon the request unit 44 requesting positional information to be transmitted, the reception unit 36 receives the positional information.

The storage unit 34 additionally stores, as a database to be used when a failure has occurred in a base station device 12, a database in which an area and so on formed by the base station device 12 is deleted and another area has been expanded. A plurality of such databases may be stored for different base station devices 12 in which a failure can occur. The generation unit 32 selects and uses one of a plurality of types of databases stored in the storage unit 34 in accordance with a base station device 12 in which an occurrence of a failure has been detected by the detection unit 42.

Figure 19:
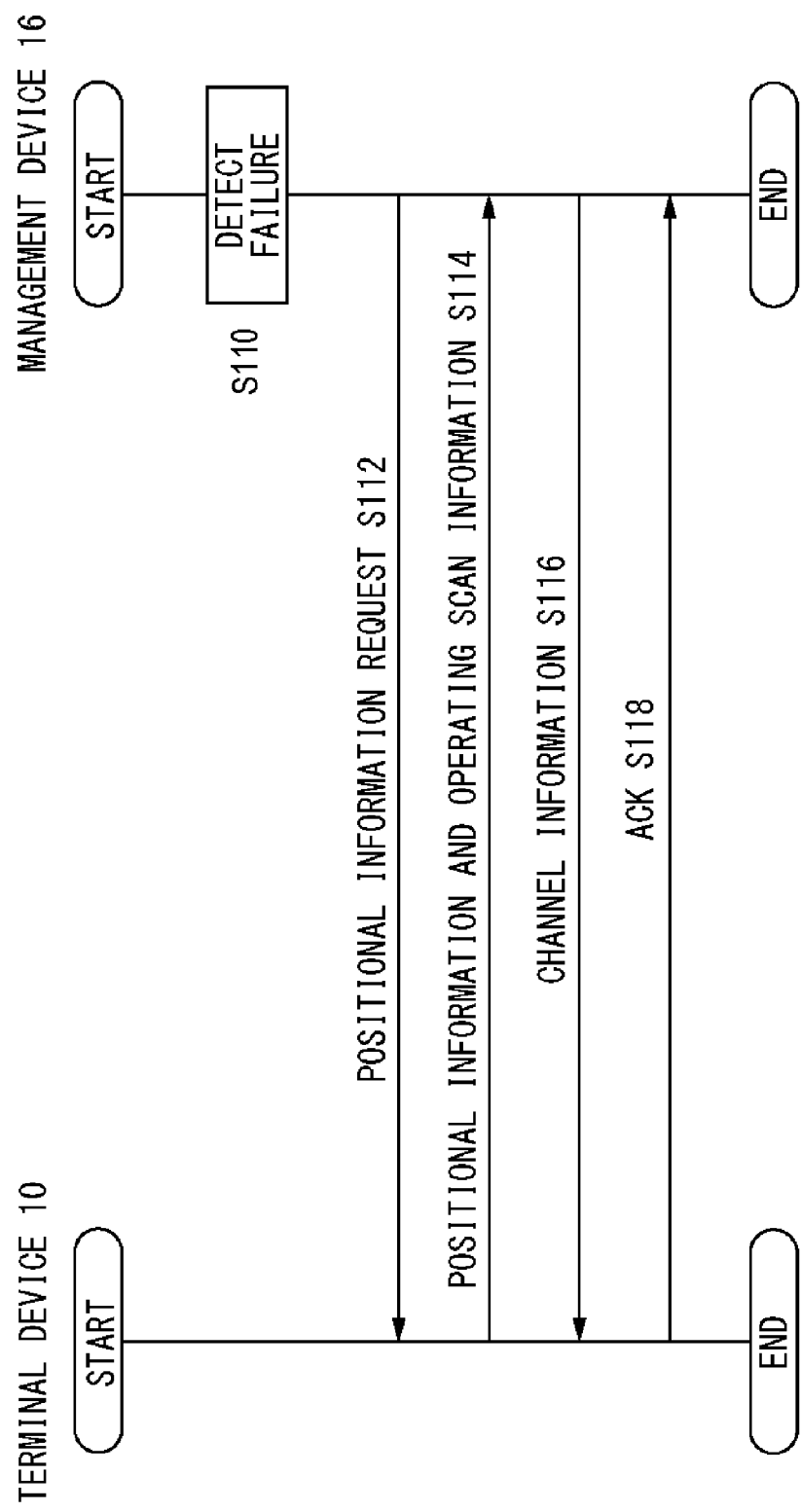
FIG. 19 is a sequence diagram illustrating a setting procedure in a communication system according to Example 4.

An operation of the communication system 100 configured as described above will be described. FIG. 19 is a sequence diagram illustrating a setting procedure in the communication system 100 according to Example 4. The management device 16 detects a failure (S110). The management device 16 transmits a positional information request to the terminal device 10 (S112). The terminal device 10 transmits positional information and operating scan information to the management device 16 (S114). The management device 16 transmits channel information to the terminal device 10 (S116). The terminal device 10 transmits ACK to the management device 16 (S118).

According to the present example, when a failure occurs in any one of the base station devices, a positional information request is transmitted to the terminal device, and thus the management device can acquire an opportunity of transmitting channel information to the terminal device. In addition, since the management device can acquire an opportunity of transmitting channel information to the terminal device, the management device can transmit channel information when the priority channel has changed. In addition, since the management device transmits the channel information when a failure has occurred in any one of the base station devices, the management device can cause the priority channel to be changed immediately. In addition, since the priority channel is changed immediately, the terminal device can carry out channel scanning processing that is appropriate in the surrounding environment.

Thus far, examples of the present invention have been described. These examples are illustrative in nature, and it should be appreciated by a person skilled in the art that various modifications can be made to the combinations of the components and the processing processes and such modifications also fall within the scope of the present invention.

In Examples 1 to 4, channel information indicates a priority channel. This, however, is a non-limiting example, and channel information may indicate a channel that is not to be subjected to the channel scanning processing of the terminal device 10. Upon receiving such channel information, the terminal device 10 carries out the channel scanning processing on channels excluding the channel indicated in the channel information. According to the present example, a channel on which a signal is less likely to be detected can be excluded in the channel scanning processing.

In Example 2, priority channels in two levels of priority ranking are used. This, however, is a non-limiting example, and priority channels in three or more levels of priority ranking may be used. According to this modification, a plurality of priority channels can be specified precisely in accordance with the possibility of detecting a signal.

What is claimed is:

1. A management device comprising:
   a reception device that receives positional information of a terminal device from the terminal device via a base station device that uses at least one of a plurality of channels;
   a generation device that generates channel information related to a channel in scan processing of the terminal device on the basis of the positional information received by the reception device;
   a storage device that stores a database that is to be referred to when the generation device generates the channel information on the basis of the positional information and that indicates a relation between the positional information and the priority channel; and
   a transmission device that transmits the channel information generated by the generation device to the terminal device via the base station device; wherein
   the channel information generated by the generation device indicates a priority channel to be used in priority when the terminal device carries out the scan processing, and
   the database stored in the storage device indicates the relation between the positional information and the priority channel such that a boundary between different priority channels is arranged at a position where a difference in reception power on the different priority channels is smaller than a threshold.

2. A management device comprising:
   a reception device that receives positional information of a terminal device from the terminal device via a base station device that uses at least one of a plurality of channels;
   a generation device that generates channel information related to a channel in scan processing of the terminal device on the basis of the positional information received by the reception device;
   a transmission device that transmits the channel information generated by the generation device to the terminal device via the base station device;
   a connection device that connects to a plurality of base station devices;
   a detection device that detects a failure that has occurred in any one of the plurality of base station devices connected to the connection device; and
   a request device that, when the detection device has detected the failure, requests the terminal device to transmit the positional information via a base station device other than the base station device in which the failure has occurred; wherein
   the reception device receives the positional information after the request device has requested the positional information to be transmitted.

3. The management device according to claim 2, wherein the channel information generated by the generation device indicates a priority channel to be used in priority when the terminal device carries out the scan processing.

4. The management device according to claim 2, wherein the channel information generated by the generation device indicates a plurality of priority channels that are to be used in priority when the terminal device carries out the scan processing and that are of different priority ranking.

5. The management device according to claim 2, further comprising:
   a storage device that stores a database that is to be referred to when the generation device generates the channel information on the basis of the positional information and that indicates a relation between the positional information and the priority channel; wherein
   the database stored in the storage device indicates the relation between the positional information and the priority channel such that a boundary between different priority channels is arranged at a position where a difference in reception power on the different priority channels is smaller than a threshold.

6. A method of scanning channels in a communication system including a terminal device and a management device for managing a base station device using one of a plurality of channels, wherein the terminal device is communicable with the base station device via the one of the plurality of channels and the management device includes a reception device, a generation device, and a transmission device, the channel-scanning method comprising the steps of:
   receiving, in the reception device, positional information of the terminal device from the terminal device via the base station device;
   generating, in the generation device, channel information related to a channel in scan processing of the terminal device on the basis of the received positional information; and
   transmitting, through the transmission device, the generated channel information to the terminal device via the base station device; wherein the channel information generated in the generating step indicates a priority channel to be used in priority when the terminal device carries out the scan processing, and a database, that is to be referred to when the generation step generates the channel information on the basis of the positional information and that indicates a relation between the positional information and the priority channel, indicates the relation between the positional information and the priority channel such that a boundary between different priority channels is arranged at a position where a difference in reception power on the different priority channels is smaller than a threshold.

7. A method of scanning channels in a communication system including a terminal device and a management device for managing a base station device using one of a plurality of channels, wherein the terminal device is communicable with the base station device via the one of the plurality of channels and the management device includes a reception device, a generation device, and a transmission device, the channel-scanning method comprising the steps of:

receiving, in the reception device, positional information of the terminal device from the terminal device via the base station device;

generating, in the generation device, channel information related to a channel in scan processing of the terminal device on the basis channel information related to a channel in scan processing of the terminal device on the basis of the received positional information;

transmitting, through the transmission device, the generated channel information to the terminal device via the base station device;

connecting to a plurality of base station devices;

detecting a failure that has occurred in any one of the plurality of base station devices connected; and when the failure is detected, requesting the terminal device to transmit the positional information via a base station device other than the base station device in which the failure has occurred; wherein the receiving step receives the positional information after the requesting step has requested the positional information to be transmitted.

8. A non-transitory computer-readable memory medium storing a computer program for, in a communication system including a terminal device and a management device for managing a base station device using one of a plurality of channels, wherein the terminal device is communicable with the base station device via the one of the plurality of channels and the management device includes a reception device, a generation device, and a transmission device, causing the base-station management device to execute steps of:

receiving, in the reception device, positional information of the terminal device from the terminal device via the base station device;

generating, in the generation device, channel information related to a channel in scan processing of the terminal device on the basis of the received positional information; and transmitting, through the transmission device, the generated channel information to the terminal device via the base station device; wherein the channel information generated in the generating step indicates a priority channel to be used in priority when the terminal device carries out the scan processing, and a database, that is to be referred to when the generation step generates the channel information on the basis of the positional information and that indicates a relation between the positional information and the priority channel, indicates the relation between the positional information and the priority channel such that a boundary between different priority channels is arranged at a position where a difference in reception power on the different priority channels is smaller than a threshold.

9. A non-transitory computer-readable memory medium storing a computer program for, in a communication system including a terminal device and a management device for managing a base station device using one of a plurality of channels, wherein the terminal device is communicable with the base station device via the one of the plurality of channels and the management device includes a reception device, a generation device, and a transmission device, causing the base-station management device to execute steps of:

receiving, in the reception device, positional information of the terminal device from the terminal device via the base station device;

generating, in the generation device, channel information related to a channel in scan processing of the terminal device on the basis of the received positional information;

transmitting, through the transmission device, the generated channel information to the terminal device via the base station device;

connecting to a plurality of base station devices;

detecting a failure that has occurred in any one of the plurality of base station devices connected; and when the failure is detected, requesting the terminal device to transmit the positional information via a base station device other than the base station device in which the failure has occurred; wherein the receiving step receives the positional information after the requesting step has requested the positional information to be transmitted.

* * * * *